(12) United States Patent
Michel

(10) Patent No.: US 7,293,278 B2
(45) Date of Patent: Nov. 6, 2007

(54) ON-DEMAND DIGITAL ASSET MANAGEMENT AND DISTRIBUTION METHOD AND SYSTEM

(75) Inventor: Walter F. Michel, Glenside, PA (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 683 days.

(21) Appl. No.: 10/756,847

(22) Filed: Jan. 13, 2004

(65) Prior Publication Data
US 2005/0198341 A1    Sep. 8, 2005

(51) Int. Cl.
*H04N 7/173* (2006.01)

(52) U.S. Cl. .......................... 725/91; 725/88; 725/102

(58) Field of Classification Search ................ 725/86, 725/87, 91, 92, 93, 98, 101, 102, 103; 709/231, 709/217–219
See application file for complete search history.

(56) References Cited

U.S. PATENT DOCUMENTS 5,893,053 A * 4/1999 Trueblood .................. 702/187
6,609,097 B2 * 8/2003 Costello et al. ............. 704/500
2003/0095790 A1 * 5/2003 Joshi .......................... 386/69

* cited by examiner

*Primary Examiner*—Ngoc Vu
(74) *Attorney, Agent, or Firm*—Brooks Kushman P.C.

(57) ABSTRACT

A content distribution network includes a central content management system that acquires digital assets for distribution over the network to on-demand serving locations for on-demand delivery to customers. A digital asset includes a package of files. The files are processed prior to distribution from the central content management system to provide trick mode support. The content distribution network distributes the processed files from the central content management system to the serving locations. A method includes breaking up the digital asset at the central content management system into chunks, utilizing a pipelined distribution process between the central content management system and the serving locations for the digital asset chunks, and re-assembling the digital asset chunks at the serving locations.

20 Claims, 3 Drawing Sheets

ON-DEMAND DIGITAL ASSET MANAGEMENT AND DISTRIBUTION METHOD AND SYSTEM

BACKGROUND OF THE INVENTION

1. Field of the Invention

The invention relates to management and distribution techniques for on-demand digital assets in a content distribution network wherein a digital asset includes a package of files that is processed to create trick mode and other additional files, and distributed to a serving location.

2. Background Art

In an existing asset management and distribution technique, an on-demand (for example, video on-demand or audio on-demand) digital asset is pitched from a central location to a regional asset management system. The on-demand digital asset in its entirety is a collection of files (for example, asset, preview, poster art, etc.). The central location passes the digital asset to the regional asset management system mainly at the individual file level as a single full package of files (for example, asset, preview, poster art, etc.).

The regional asset management system forwards valid digital assets in their entirety to the application asset manager. The application asset manager may be, for example, a video on-demand (VOD) asset management system. The application asset manager processes the package of files associated with the digital asset to provide trick mode, pre-scrambling, etc. The resulting files are propagated to downstream servers for delivery to customers.

Trick mode support is the ability to provide personalized features to the end user by providing them from the serving location. In this way, the serving platform itself may provide trick mode features such as play, pause, rewind, fast forward, etc. The benefit of trick mode is that features typically associated with the end user location are instead provided from the serving location.

In another existing asset management and distribution technique, pre-processing has been moved to a centralized location. That is, processing the package of files associated with the digital asset to provide trick mode, pre-scrambling, etc. occurs at the centralized location instead of at the application asset manager.

In both existing techniques, the digital assets are dealt with mainly at the individual file level until reaching the serving location. The time and resources that it takes to pre-process and fully distribute a digital asset can be quite significant. As such, significant time and resources are involved with the file level operations as the digital assets progress from a central location to a serving location.

SUMMARY OF THE INVENTION

It is an object of the invention to improve asset management and distribution. Rather than processing files in their entirety, the invention comprehends dealing with files in manageable pieces. In turn, the invention comprehends dealing with digital assets in smaller, manageable pieces as opposed to at the individual file level. In accordance with the invention, chunks of the digital asset are pipelined through the distribution process.

In carrying out the invention, a method of asset management and distribution are provided for use in a content distribution network. The content distribution network includes a central content management system that acquires digital assets for distribution over the network to on-demand serving locations for on-demand delivery to customers. A digital asset includes a package of files. The files are processed prior to distribution from the central content management system to provide trick mode support. The content distribution network distributes the processed files from the central content management system to the serving locations. The method comprises breaking up the digital asset at the central content management system into chunks, utilizing a pipelined distribution process between the central content management system and the serving locations for the digital asset chunks, and re-assembling the digital asset chunks at the serving locations.

It is appreciated that the content distribution network may take many forms. Further, it is appreciated that the invention applies to on-demand digital assets such as video on-demand or audio on-demand. On that same note, it should be understood that the serving location may take any suitable form, and a VOD server is just one contemplated arrangement. Also, the central management system is central with respect to the serving locations but the invention is contemplated as useable on a variety of scales and distribution arrangements. The pipelined distribution process starts at the central content management system and extends toward the serving locations. However, the entire path to the serving locations need not be a continuous pipeline as many variations are possible.

At a more detailed level, the invention comprehends having digital asset chunks from more than one digital asset in the pipelined distribution at the same time. This permits prioritization of the physical resources (for example, computers, communication links, satellite bandwidth, etc.) at a finer granularity than existing asset management and distribution techniques that operate at the file level. For example, at a time when the central location is currently feeding chunks of a first digital asset into the pipeline, this activity could be momentarily preempted to allow for feeding chunks of a second digital asset into the pipeline.

Further, in carrying out the invention, a content distribution network is provided. The network comprises a central content management system, a plurality of on-demand serving locations, and a pipelined distribution process implemented in the network. The central content management system acquires digital assets for distribution. Each digital asset includes a package of files. The files are processed prior to distribution from the central content management system to provide trick mode support such that departing chunks have already received trick mode processing. The central content management system breaks up the digital asset into chunks for departure. The serving locations receive distributed digital assets for on-demand delivery to users. The plurality of on-demand serving locations re-assemble the arriving digital asset chunks to recreate the digital assets with trick mode support. The pipelined distribution process occurs between the central content management system and the plurality of on-demand serving locations for distributing the digital asset chunks in a pipelined fashion.

DETAILED DESCRIPTION OF THE PREFERRED EMBODIMENT

Figure 1:
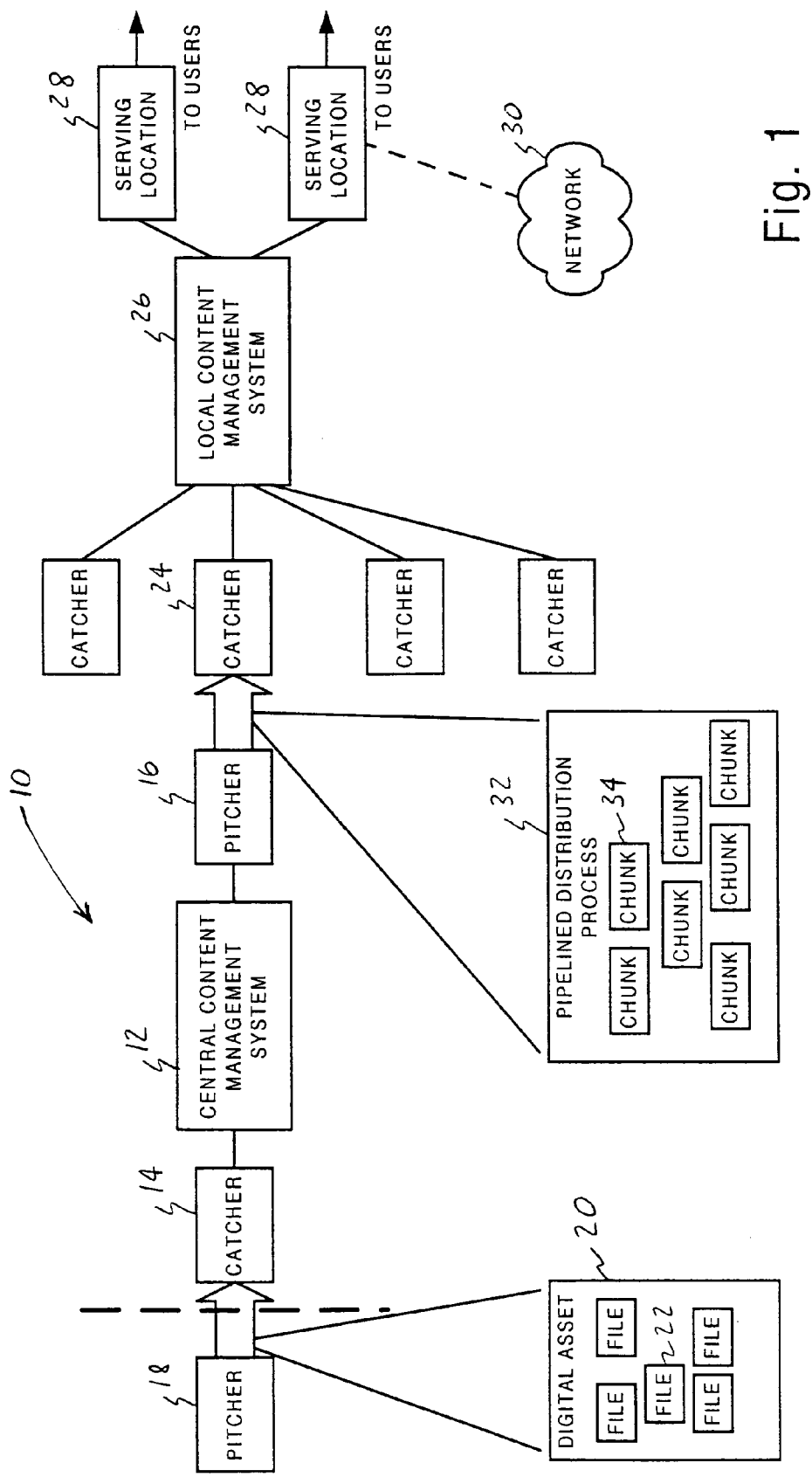
FIG. 1 is a content distribution network made in accordance with the invention.

FIG. 1: illustrates a content distribution network 10. Content distribution network 10 includes a central content management system 12. System 12, with catcher 14, acquires digital assets for distribution. Pitcher 16 distributes digital assets from central content management system 12. A digital asset 20 is shown being acquired by catcher 14 from pitcher 18. Digital asset 20 includes a package of files 22.

Files 22 are processed prior to distribution from central content management system 12 to provide trick mode and other additional files. The trick mode support provides the ability to give personalized features to the end user. The benefit of trick mode is that features typically associated with the end user location are instead provided from the serving location. Exemplary features include play, pause, rewind, fast forward, etc.

Catcher 24 catches digital assets pitched by pitcher 16 of central content management system 12. Catcher 24 is part of local content management system 26, which also includes other catchers. Local content management system 26 provides digital assets to serving locations 28. Serving locations 28 receive propagated files and perform the delivery to customers. As shown, serving locations 28 are optionally connected to network 30 for providing support for additional applications.

With continuing reference to FIG. 1, a pipelined distribution process 32 is implemented in the network 10 between central content management system 12 and serving locations 28. Digital asset chunks 34 are shown passing through the pipeline process 32. That is, the on-demand digital asset which in its entirety is a single full package of files (for example, asset, preview, poster, etc.) is pipelined through the distribution process 32 as chunks 34 of the digital asset 20.

More specifically, digital asset 20 is broken up at central content management system 12 into chunks 34 for departure. Pipelined distribution process 32 between central content management system 12 and serving locations 28 is utilized for distributing the digital asset chunks 34. Digital asset chunks 34 reach the end of the pipeline and eventually arrive at serving locations 28 where the chunks 34 are re-assembled to recreate digital asset 20 with trick mode support. It is appreciated that the invention improves asset management and distribution. Digital assets are dealt with in smaller, manageable pieces as opposed to at the individual file level. The pipelining reduces the time and resources that it takes to fully distribute a digital asset.

It is appreciated that content distribution network 10 may take many forms. Serving locations 28 may include video on-demand or audio on-demand serving locations.

At the detailed level of the preferred embodiment, a key concept is the chunking of the data, the transporting of those chunks through the distribution process chain, and the subsequent reassembling at the tail end. For a VOD asset, a chunk is defined as a well-defined segment of the content, any necessary trick mode or other associated file construction, and any appropriate reconstruction rules to assemble with prior and next chunks at the tail end. That is, each chunk includes all file parts for a given time segment. In this way, content is divided up into time segments. Further, it is appreciated that the digital asset includes a collection of files. The main feature file of the asset will always be chunked but it is possible that one of the small files could be sent as a single chunk (for example, preview or poster art).

Figure 2:
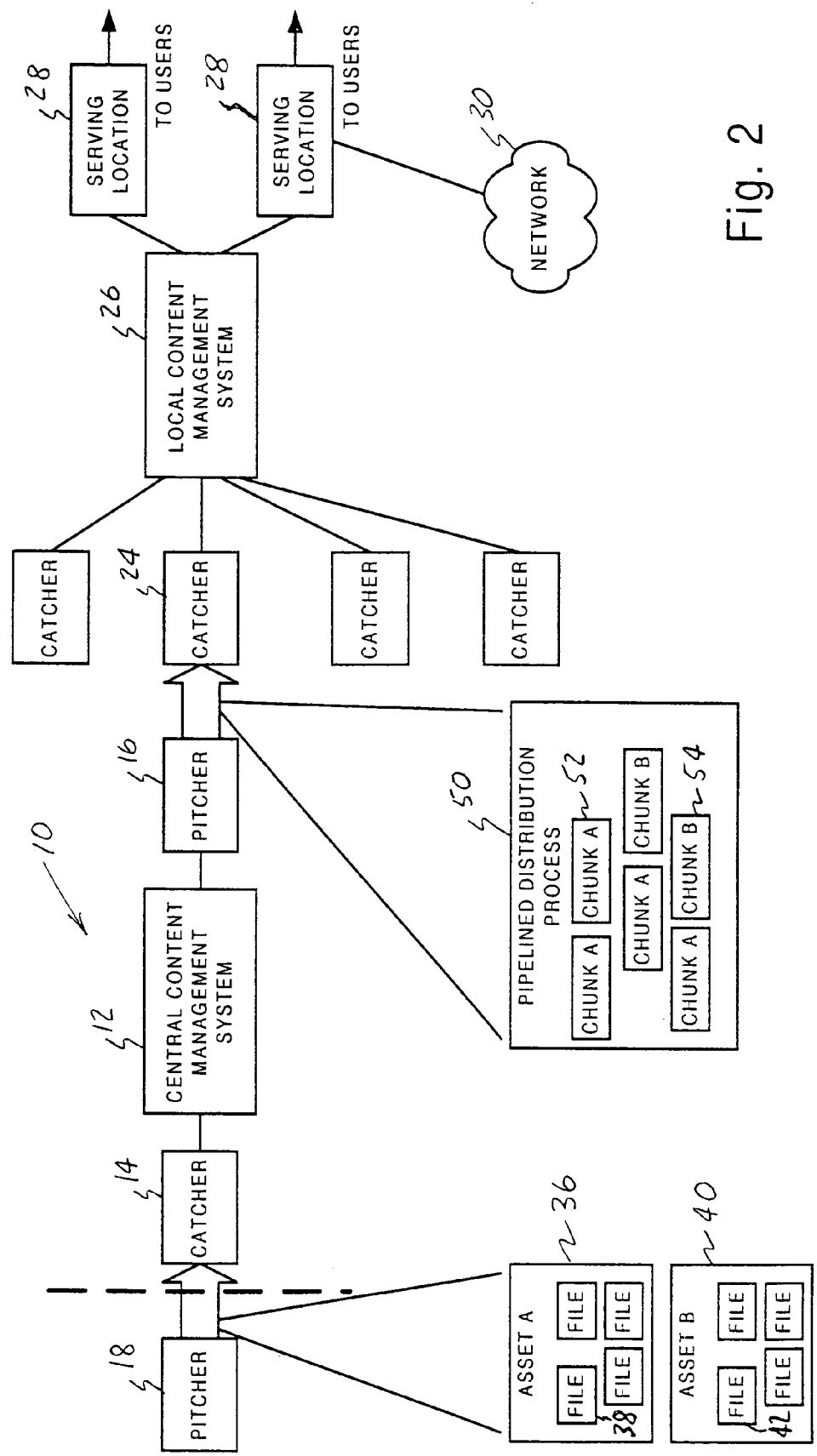
FIG. 2 is a content distribution network illustrating chunks from multiple assets entering the pipelined distribution process on a priority basis.

In another aspect of the invention, multiple digital assets may be processed with individual chunks of both assets being pipelined through the process at the same time to allow prioritization of the physical resources at a finer granularity than existed techniques. This aspect is best illustrated in FIG. 2. FIG. 2 illustrates a content distribution network 10. In FIG. 2, a first digital asset 36 is composed of files 38 while a second digital asset 40 is composed of files 42. As shown, chunks 52 of first digital asset 36 and chunks 54 of second digital asset 40 are within the pipelined distribution process 50 and preferably enter the pipeline on a priority basis. At the tail end, chunks 52 are reassembled at a serving location 28 to recreate first digital asset 36 with trick mode support, and chunks 54 are reassembled at a serving location 28 to recreate second digital asset 40 with trick mode support.

It is appreciated that the arrangement of FIG. 2 is advantageous in that the pipelined distribution process 50 receives chunks of multiple digital assets departing from central content management system 12. With chunks entering the pipeline on a priority basis, the chunks are distributed such that they arrive at the serving locations 28 to recreate the multiple digital assets with trick mode support. With this advantageous additional aspect of the invention, many arrangements are contemplated. For example, in an arrangement where digital assets at serving locations 28 are made available to users prior to complete arrival of all associated chunks, the priority basis for chunks entering the pipeline may be based on the usage characteristics of the digital assets at the serving locations. There may also be an arrangement where digital chunks enter the pipeline prior to complete processing of the digital asset by central management system 12. Put another way, the invention comprehends dealing with on-demand digital assets in smaller, manageable pieces as opposed to at the individual file level with chunks of the digital assets being pipelined through a pipelined distribution process. Accordingly, with the pipelining in place, many advantages may become apparent to one of ordinary skill in the art and many variations may be made within the network to take advantage of the pipelining. And further, the network itself may take any suitable form and the invention applies to many arrangements of digital asset distribution.

Figure 3:
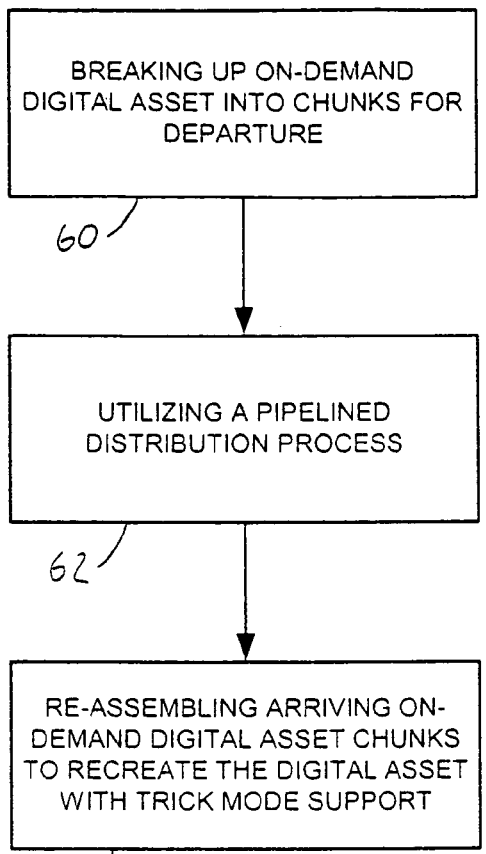
FIG. 3 illustrates a method of the invention.

FIG. 3 illustrates a method of asset management and distribution. At block 60, a digital asset at the central content management system is broken up into chunks for departure. At block 62, a pipelined distribution process between the central content management system and the serving location is utilized for the digital asset chunks. At block 64, the digital asset chunks arriving at the serving locations are re-assembled to recreate the digital asset with the trick mode support.

Figure 4:
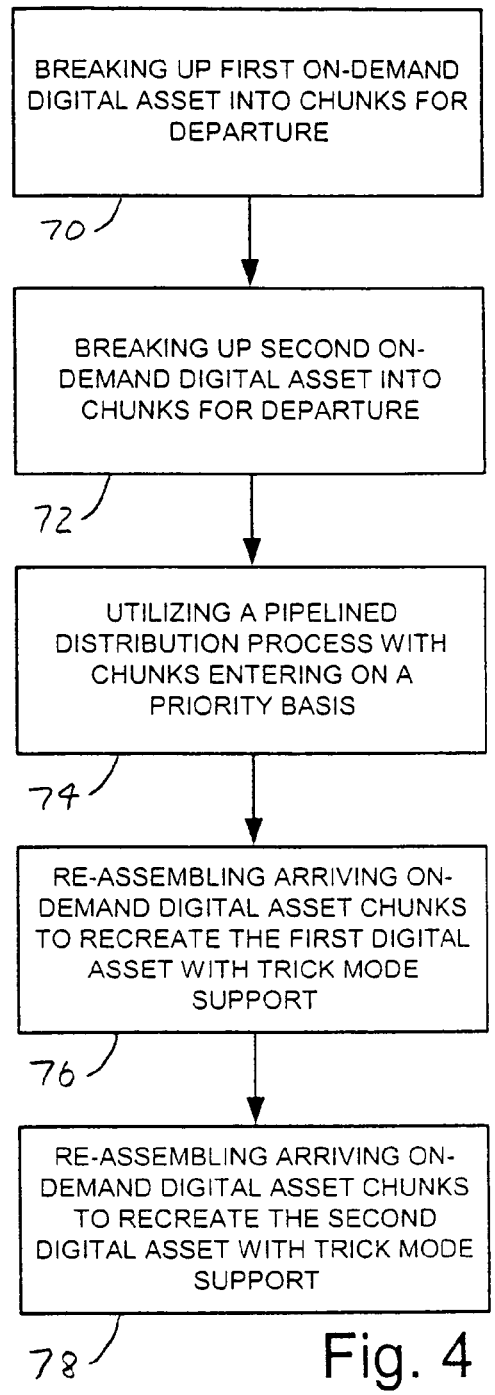
FIG. 4 illustrates a method of the invention wherein chunks enter the pipelined distribution process on a priority basis.

FIG. 4 illustrates another method of the invention. At block 70 and 72, first and second digital assets are broken up into chunks for departure. At block 74, a pipelined distribution process with chunks entering on a priority basis is utilized. At blocks 76 and 78, digital asset chunks are reassembled upon arrival to recreate the first and second digital assets with trick mode support.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of asset management and distribution for use in a content distribution network, the content distribution network includes a central content management system that acquires digital assets for distribution to on-demand serving locations for on-demand delivery to users, each digital asset includes a package of files, the files being processed prior to distribution from the central management system to provide trick mode support, the method comprising:

breaking up the digital asset at the central content management system into chunks for departure;
utilizing a pipelined distribution process between the central content management system and the serving locations for the digital asset chunks, each chunk including a well-defined segment of content with trick mode support and any appropriate reconstruction rules to assemble with prior and next chunks at the serving locations;
re-assembling the digital asset chunks arriving at the serving locations to recreate the digital asset with trick mode support; and
serving the digital asset from a serving location to a user.

2. The method of claim 1 wherein the digital assets include video on-demand (VOD) assets and wherein the on-demand serving locations include VOD serving locations.

3. The method of claim 1 wherein the digital assets include audio on-demand assets and wherein the on-demand serving locations include audio on-demand serving locations.

4. A method of asset management and distribution for use in a content distribution network, the content distribution network includes a central content management system that acquires digital assets for distribution to on-demand serving locations for on-demand delivery to users, each digital asset includes a package of files, the files being processed prior to distribution from the central management system to provide trick mode support, the method comprising:

breaking up a first digital asset at the central content management system into first chunks for departure;
breaking up a second digital asset at the central content management system into second chunks for departure;
utilizing a pipelined distribution process between the central content management system and the serving locations for the first chunks and second chunks, wherein first chunks and second chunks depart from the central content management system and enter the pipelined distribution process on a priority basis, each first chunk including a well-defined segment of content with trick mode support and any appropriate reconstruction rules to assemble with prior and next first chunks at the serving locations, each second chunk including a well-defined segment of content with trick mode support and any appropriate reconstruction rules to assemble with prior and next second chunks at the serving locations;
re-assembling the first digital asset chunks arriving at the serving locations to recreate the first digital asset with trick mode support;
re-assembling the second digital asset chunks arriving at the serving locations to recreate the second digital asset with trick mode support;
serving the first digital asset from a serving location to a user; and
serving the second digital asset from a serving location to a user.

5. The method of claim 4 wherein the digital assets include video on-demand (VOD) assets and wherein the on-demand serving locations include VOD serving locations.

6. The method of claim 4 wherein the digital assets include audio on-demand assets and wherein the on-demand serving locations include audio on-demand serving locations.

7. A content distribution network comprising:

a central content management system that acquires digital assets for distribution, each digital asset including a package of files, the files being processed prior to distribution from the central content management system to provide trick mode support, wherein the central content management system breaks up the digital asset into chunks for departure;
a plurality of on-demand serving locations receiving distributed digital assets for on-demand delivery to users, wherein the plurality of on-demand serving locations re-assemble the arriving digital asset chunks to recreate the digital assets with trick mode support; and
a pipelined distribution process implemented in the content distribution network between the central content management system and the plurality of on-demand serving locations for distributing the digital asset chunks in a pipelined fashion, each chunk including a well-defined segment of content with trick mode support and any appropriate reconstruction rules to assemble with prior and next chunks at the serving locations.

8. The system of claim 7 wherein the digital assets include video on-demand (VOD) assets and wherein the on-demand serving locations include VOD serving locations.

9. The system of claim 7 wherein the digital assets include audio on-demand assets and wherein the on-demand serving locations include audio on-demand serving locations.

10. The system of claim 7 wherein the pipelined distribution process receives chunks of multiple digital assets departing from the central content management system that enter the pipeline on a priority basis, and distributes the chunks such that they arrive at the serving locations to recreate the multiple digital assets with trick mode support.

11. A method of asset management and distribution for use in a content distribution network, the content distribution network includes a central content management system that acquires digital assets for distribution to on-demand serving locations for on-demand delivery to users, each digital asset includes a package of files, the files being processed prior to distribution from the central management system to provide trick mode support, the method comprising:

utilizing a pipelined distribution process, between the central content management system and the serving locations for a digital asset, the digital asset being broken up into digital asset chunks during at least a portion of the pipelined distribution process each chunk including a well-defined segment of content with trick mode support and any appropriate reconstruction rules to assemble with prior and next chunks at the serving locations.

12. The method of claim 11 further comprising:

breaking up the digital asset at the central content management system into chunks for departure.

13. The method of claim 11 further comprising:
re-assembling the digital asset chunks arriving at the serving locations to recreate the digital asset with trick mode support; and
serving the digital asset from a serving location to a user.

14. The method of claim 11 wherein the digital assets include video on-demand (VOD) assets.

15. The method of claim 11 wherein the digital assets include audio on-demand assets.

16. A method of asset management and distribution for use in a content distribution network, the content distribution network includes a central content management system that acquires digital assets for distribution to on-demand serving locations for on-demand delivery to users, each digital asset includes a package of files, the files being processed prior to distribution from the central management system to provide trick mode support, the method comprising:
utilizing a pipelined distribution process between the central content management system and the serving locations for first and second digital assets, the first and second digital assets being broken up into first chunks and second chunks during at least a portion of the pipelined distribution process, wherein first chunks and second chunks are handled by the pipelined distribution process on a priority basis, each first chunk including a well-defined segment of content with trick mode support and any appropriate reconstruction rules to assemble with prior and next first chunks at the serving locations, each second chunk including a well-defined segment of content with trick mode support and any appropriate reconstruction rules to assemble with prior and next second chunks at the serving locations.

17. The method of claim 16 further comprising:
breaking up the first digital asset at the central content management system into first chunks for departure; and
breaking up the second digital asset at the central content management system into second chunks for departure.

18. The method of claim 16 further comprising:
re-assembling the first digital asset chunks arriving at the serving locations to recreate the first digital asset with trick mode support;
re-assembling the second digital asset chunks arriving at the serving locations to recreate the second digital asset with trick mode supports;
serving the first digital asset from a serving location to a user; and
serving the second digital asset from a serving location to a user.

19. The method of claim 16 wherein the digital assets include video on-demand (VOD) assets.

20. The method of claim 16 wherein the digital assets include audio on-demand assets.

* * * * *